United States Patent [19]
Asai

[11] Patent Number: 5,261,111
[45] Date of Patent: Nov. 9, 1993

[54] PIPELINED PROCESSOR FOR VECTOR DATA CLASSIFICATION ACCORDING TO VECTOR ATTRIBUTES USING COUPLED COMPARATOR CHAIN AND LOGIC GATE TO RESPECTIVE BIN CHAIN

[75] Inventor: Kiyoshi Asai, Ibaraki, Japan

[73] Assignee: Japan Atomic Energy Research Institute, Tokyo, Japan

[21] Appl. No.: 421,343

[22] Filed: Oct. 13, 1989

[30] Foreign Application Priority Data

Oct. 18, 1988 [JP] Japan ................................ 63-262071

[51] Int. Cl.⁵ .......................... G06F 7/08; G06F 7/06; G06F 15/347
[52] U.S. Cl. ................................ 395/800; 364/232.21; 364/254.6; 364/259.2; 364/224.9; 364/924.4; 364/947.2; 364/948.34; 364/DIG. 1; 364/769; 340/146.2
[58] Field of Search ............... 364/769; 395/325, 425, 395/800; 340/146.2

[56] References Cited

U.S. PATENT DOCUMENTS

| | | |
|---|---|---|
| 4,541,046 | 9/1985 | Nagashima et al. |
| 4,677,547 | 6/1987 | Omoda et al. |
| 4,760,518 | 7/1988 | Potash et al. |
| 4,760,525 | 7/1988 | Webb |
| 4,792,893 | 12/1988 | Nakagawa et al. |
| 4,809,158 | 2/1989 | McCauley ............................ 364/200 |
| 4,823,258 | 4/1989 | Yamazaki ............................ 364/200 |
| 4,841,438 | 6/1989 | Yoshida et al. |
| 4,868,824 | 9/1989 | Golden ............................ 371/53 |
| 4,885,678 | 12/1989 | Kojima et al. |
| 4,885,703 | 12/1989 | Deering ............................ 364/522 |
| 4,888,679 | 12/1989 | Fossum et al. |
| 4,928,238 | 5/1990 | Sekiguchi |
| 4,945,479 | 7/1990 | Rusterholz et al. |
| 4,958,375 | 9/1990 | Reilly et al. ............................ 382/14 |
| 4,967,350 | 10/1990 | Maeda et al. |
| 4,987,539 | 1/1991 | Moore et al. ............................ 364/413.08 |
| 5,014,327 | 5/1991 | Potter et al. ............................ 382/14 |
| 5,109,523 | 4/1992 | Kanada et al. ............................ 395/800 |

FOREIGN PATENT DOCUMENTS 59-83429(A) 5/1984 Japan.

OTHER PUBLICATIONS

Kiyoshi Asai et al., *Proposition of Monte Carlo Pipelines*, 31st Nat'l Conf. of Info. Processing Soc. of Japan (1985 latter term) (English translation).

Kiyoshi Asai et al., *Vector-Parallel Processing of Monte Carlo Computation*, 31st Nat'l Conf. of Info. Processing Soc. of Japan (1985 latter term) (English translation).

"Vectorization of the KENO-IV Code" by Kiyoshi Asai et al., Nuclear Science and Engineering: 92, 1986, pp. 298-307.

*Primary Examiner*—Parshotam S. Lall
*Assistant Examiner*—Ken S. Kim
*Attorney, Agent, or Firm*—Banner, Birch, McKie & Beckett

[57] ABSTRACT

A classification processing unit is disclosed for use with a computer having a register for storing classification data items and for storing data items respectively associated with the classification data items. The classification processing unit includes a comparator for receiving the classification data items from the register, which has an array of comparator units, each unit having a reference value for comparison with the classification data items. The processing unit also includes a classification pipline having an array of classification units respectively associated with the comparator units. The classification pipeline receives data items respectively associated with the classification data items and stores the data items respectively associated with said classification data items into the register in response to trigger signal from the comparator. The processing unit further has a counter provided for each of the classification units to count the number of data items that are stored by the processing unit.

10 Claims, 6 Drawing Sheets

(−1∪4∪7)∪(2∩−3)∪(5∩6)∩−8 --- LOGICAL EXPRESSION A
(0∪1∪1)∪(0∩1)∪(1∩1)∩ 0 --- LOGICAL EXPRESSION B

LIST: (0 V 1 V 1 ) V (0 V 0 ) ! 0 V 1 V 1 ! ------

------ ( (0 V 1 V 1 ) V ( 1 ∧ 0 ) V ( 1 ∧ 1 ) ) ∧ 0 !?

1, 1, ----- 0

OPERATORS =

- ¬ (10001); NOT (NUMERALS ARE EXPRESSION ON SOURCE PROGRAM)
- ( (10002); LEFT PARENTHESIS
- ) (10003); RIGHT PARENTHESIS
- ∧ (10004); AND
- ∨ (10005); INCLUSIVE-OR
- ♯ (10006); STARTING END OF PARTICLE LIST
- ! (10007); TERMINATING END OF PARTICLE LIST
- ¥ (10008); STARTING END OF WHOLE PARTICLE LIST
- ? (10009); TERMINATING END OF WHOLE PARTICLE LIST

PIPELINED PROCESSOR FOR VECTOR DATA CLASSIFICATION ACCORDING TO VECTOR ATTRIBUTES USING COUPLED COMPARATOR CHAIN AND LOGIC GATE TO RESPECTIVE BIN CHAIN

BACKGROUND OF THE INVENTION

1. Field of the Invention

The present invention relates to processing units for a vector computer and, more particularly, to pipeline processing units and an address preset processing unit for use in a supercomputer.

2. Description of the Prior Art

In the simulation of physical phenomena by means of a computer, it is necessary to describe the movement of substances by use of continuum models or particle models and decide as well as classify their behavior at each sampling point of time.

For example, in the field of nuclear power technology, particle models are generally used to describe the movement of particles such as neutrons and photons in three-dimensional complex geometric spaces and in such a case each individual particle has as its attributes a particle number and a domain number which represents a spatial domain where the particle exists at present. The domain is constituted by a combination of a logical sum and product of three-dimensional basic configurations defined previously, such as a circular cylinder, a sphere, a rectangular parallelepiped, etc. (the combination being referred to as "solid model") or a combination of a logical sum and product of a plurality of curved surfaces defined previously (the combination being referred to as "surface model"). a set of such particles (hereinafter referred to as a "bank") is handled as a one-dimensional array such as that shown in FIG. 2 in order to process data in the form of vectors. In the particle bank shown in FIG. 2, the numerals 1 ... N put at the upper side of the array denote the respective positions in the bank, while the numerals in the bank exemplarily show particle numbers.

When the particles move, it is necessary to make a check to ascertain whether or not each particle remains within the previous domain at each sampling point of time and it is necessary in order to effect such a check to make a decision by performing a computation in regard to each individual particle for each geometric configuration of the domain to which it belongs. To perform the decision by vector processing, the following method may be considered. Namely, particles are classified according to domains having different configurations such as a sphere, circular cylinder, rectangular parallelepiped, etc. to prepare a group of subbanks, which are subsets, and vector processing is carried out for each subbank at a stroke. However, the classification of particles, which cannot be conducted by vector processing, requires a time-consuming form of processing and constitutes one of the obstacles to computational processing in this field in the use of a vector computer.

The physical behavior of particles, such as the length of stay in a domain and the reflection and absorption at the domain surface, are expressed in the form of a logical decision which is given by a true/false value, i.e., 1 or 0, in the field of scientific and technological computation. Classification of the behavior of particles that is expressed in the form of a true/false value has heretofore been conducted by the use of collection and diffusion instructions on the basis of the value, 1 or 0, which is loaded on a mask register. However, this is also a time-consuming form of processing and constitutes another obstacle to computational processing in this field in the use of a vector computer.

As has been described above, a three-dimensional spatial domain is defined by a solid model or a surface model. For example, in a surface model having a configuration such as that shown in FIG. 3, the domain of a cell D is expressed as shown by the logical expression A using the surface numbers 1 to 8 (in the expression, the numerals are surface numbers and the signs indicate whether the domain is in a negative or positive direction with respect to the surface. In the definition of the configurations, a domain which is computationally contradictory may occur due to an input error, a computational error or a logical error in the computer program. FIG. 4 shows one example of the occurrence of such a contradictory domain. More specifically, when the union of two polygons A and B shown in FIG. 4(a) is to be computed, the vertex made up of the sides a and b of the polygon A and the vertex made up of the sides c and d of the polygon B are close to each other. In this case, an undefined domain C such as that indicated by the arrow in FIG. 4(b) may occur due to a computational error or some other error, or it may be erroneously decided that the sides b and c intersect each other but the sides a and d do not intersect each other, as shown in FIG. 4(c). In such a case, the union cannot be correctly computed.

In a simulation computation, if a particle enters the contradictory domain (such a particle being referred to as a "lost particle"), the particle's domain number being an attribute value thereof is not coincident with the domain number of the domain where the particle should actually exist. If the computation is continued with the lost particle being left as it is, a runaway of the computer program may be caused. Therefore, in order to discover the lost particle during the computation, the following method is employed in the case of a surface model, for example:

(i) Each time a particle enters a new domain, a curved surface expression (each surface number shown in FIG. 3 corresponds to an expression that defines a surface) is selected from a logical expression that defines the new domain (i.e., the logical expression A in the case where the new domain is the domain D) and the coordinates representing the position of the particle are substituted into the expression to obtain a positive, negative or zero value.

(ii) If the sign of the value resulting from the substitution is coincident with the sign of the corresponding surface number in the logical expression defining the domain concerned, the surface number is replaced by 1, whereas, if the two signs are not coincident with each other, the corresponding surface number in the logical expression is replaced by 0.

(iii) The procedures (i) and (ii) are carried out for all the surface numbers in the logical expression, thereby obtaining a logical expression in which each of the surface numbers of the former expression is replaced by 1 or 0. The logical expression B shown in FIG. 3 is one example of the result obtained by carrying out this procedure with respect to the logical expression A for a certain particle.

(iv) The logical expression obtained in (iii) is computed, and if the resulting value is 0, it is decided that the particle is present in a domain having a contradiction, that is, a lost particle.

Since the above-described computation of the logical expression includes many conditional branches, if it is intended to collectively process logical expressions for all particles by a vector computer, the computing speed cannot be increased and this is one of the obstacles to computational processing in this field by a vector computer.

As has been described above, in the simulation of a physical phenomenon by means of a particle model, a large number of particles are all moved together in a space, and after absorption into a substance, scattering at the substance surface, etc. has been judged, the particles are classified into subbanks, i.e., a group of particles concerned with the absorption, a group of particles concerned with the scattering, etc., and a computation is further carried out for each particle group. At this time, the computational quantity of the vector processing for each particle group is generally small and the computational quantity of the scalar processing executed to compute the address of a variable in advance is larger than that of the vector processing. Accordingly, if, while the vector processing unit and the scalar processing unit are executing a DO loop, that is, a repetitive computation, the address of a variable used in the next DO loop is computed in parallel with the execution of the present DO loop, it is possible to shorten the time required for the computation. Although some of the conventional large-scale vector computers have a function by which scalar processing and vector processing are executed in parallel, the conventional vector computer systems suffer from the disadvantages that each loop contains many computations including scalar processings and the parallel operation is obstructed and that it is only possible to sequentially execute the instruction at the address indicated by a program counter that is being executed but it is impossible to execute in parallel a scalar instruction which is stored in a distant address.

Thus, conventional vector computers are incapable of using vector processing for various classification processings, decision of a contradictory domain and other processings and cannot completely perform computational processing of a variable address and ordinary processing in parallel. Therefore, there has heretofore been a limit to the increase of the processing speed of vector computers. Under these circumstances, it is an object of the present invention to solve these problems and increase the processing speed of vector computers.

SUMMARY OF THE INVENTION

The present invention solves the above-described problems by adding, to a conventional vector computer, classification pipelines such as a pipeline for classifying data according to the attributes and a pipeline for classifying data expressed by logical values, a decision pipeline for discovering a contradiction in the attributes of data, and an address preset processing unit for previously computing a variable address by parallel processing.

DETAILED DESCRIPTION OF THE PREFERRED EMBODIMENTS

Figures 1, 2:
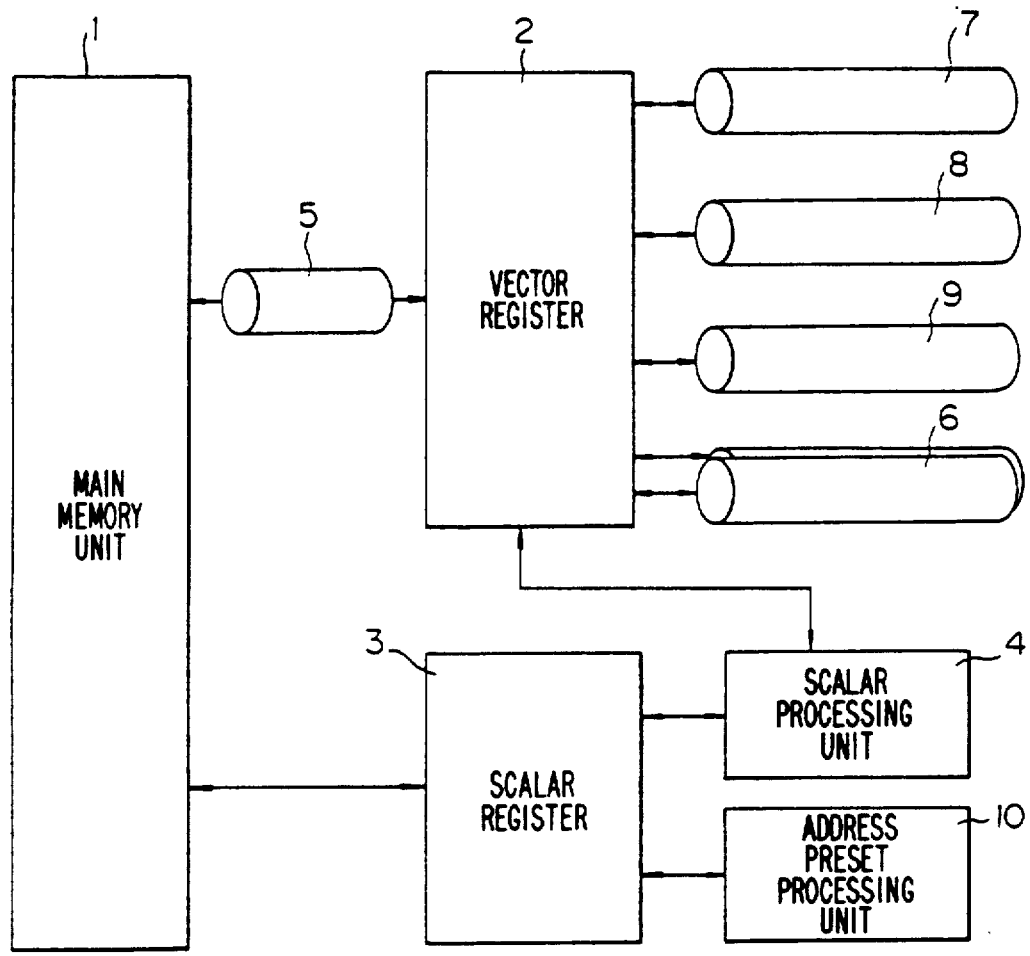
FIG. 1 is a block diagram showing the general arrangement of a vector computer system which is additionally provided with the pipelines and address preset processing unit according to the present invention.
FIG. 2 shows the arrangement of a particle bank used in a vector computer.

Embodiments of the processing units for a vector computer according to the present invention will be described below with reference to the accompanying drawings, in which the same reference numerals denote the same or corresponding constituent elements.

Referring first to FIG. 1, which shows the general arrangement of a vector computer system which is additionally provided with the pipelines and address preset processing unit according to the present invention, the reference numeral 1 denotes a main memory unit, 2 a vector register, 3 a scalar register (cache register), 4 a scalar processing unit, 5 a load/store pipeline, and 6 a processing pipeline, which are constituent elements of a conventional vector computer. The reference numeral 7, 8 and 9 denote pipelines according to the present invention, that is, a geometric classification pipeline, an event classification pipeline and a domain decision pipeline, respectively, which are coupled to the vector register 2 in addition to the conventional pipeline 6. The reference numeral 10 denotes an address preset processing unit according to the present invention which is coupled to the scalar register 3 in addition to the conventional scalar processing unit 4.

Figure 5:
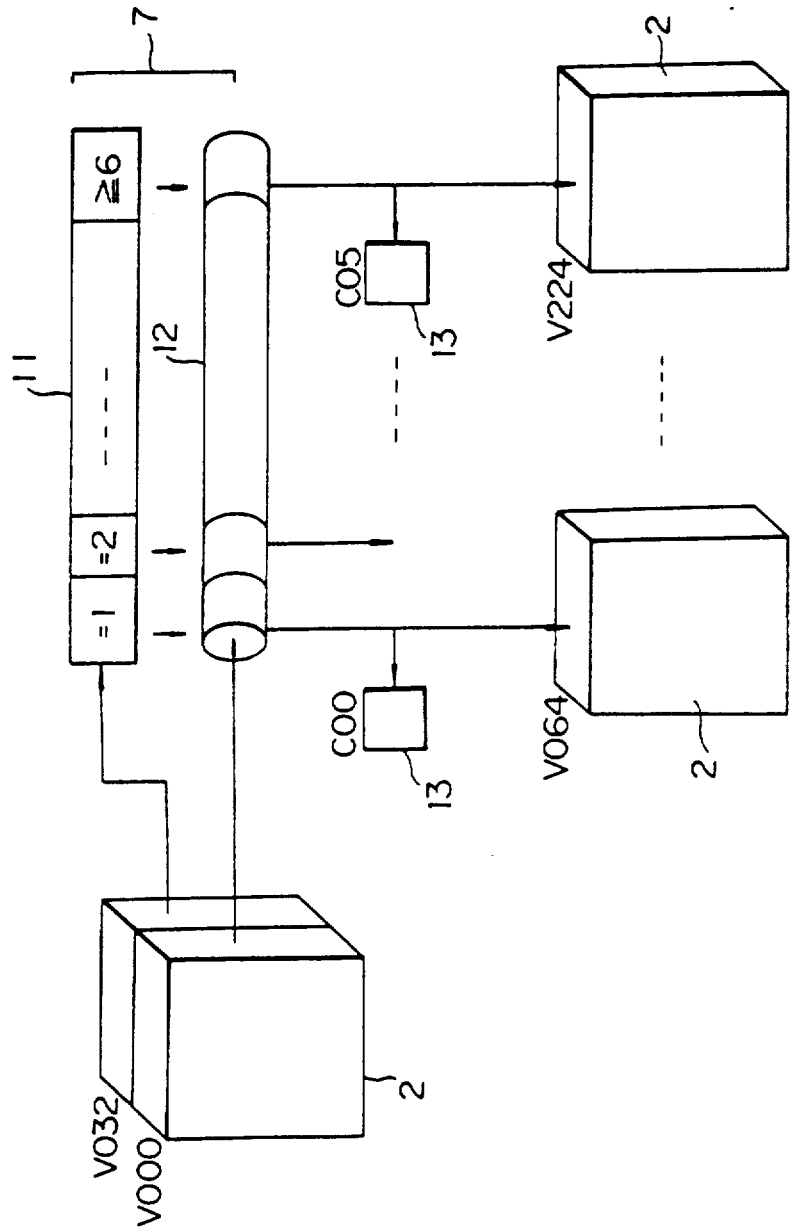
FIG. 5 is a block diagram of the geometric classification pipeline in the case where the vector register is divided into eight equal parts.

FIG. 5 is a block diagram of the geometric classification pipeline 7 in the case where the vector register 2 is divided into eight equal parts. The number of divisions of the vector register 2 is not necessarily limited to eight but may be selected as desired according to need. Referring to FIG. 5, the geometric classification pipeline 7 comprises a comparator 11 and a classification pipeline 12 which are coupled to the vector register 2 so that each of them receives data from the vector register 2. The comparator 11 is comprised of comparator units arranged in a one-dimensional array so that data given to one end thereof is shifted toward the other end, and the classification pipeline 12 is comprised of gates similarly arranged in a one-dimensional array so that data given to one end thereof is shifted toward the other end. The comparator 11 and the classification pipeline 12 correspond to each other at each stage so that a trigger signal generated in accordance with the result of comparison in each stage is given to the corresponding stage of the classification pipeline 12. The bank V000 of the vector register 2 is stored with data concerning each particle, while the bank V032 is stored with data representing the domain number of each particle, and data items that correspond to each other are synchronously supplied to the comparator 11 and the classification pipeline 12. The comparator 11 makes a comparison between the domain number of each particle supplied thereto and a domain number as being a reference for classification and triggers the classification pipeline 12 according to the result of the comparison. In response to the trigger, the classification pipeline 12 stores the corresponding particle data into the corresponding region in the vector register 2 and, at the same time, increments the count of the corresponding counter 13 by one. More specifically, if the supplied particle domain number is equal to 1, the data concerning the particle is stored in the bank V064 of the vector register 2 and, at the same time, the counter C00 is incremented by one; if the particle domain number is equal to 2, the particle data is stored in the bank V096 and, at the same time, the counter C01 is incremented by one; and if the particle domain number is equal to or greater than 6 or is a number other than 1 to 5, the particle data is stored in the bank V224 and, at the same time, the counter C05 is incremented by one. In this way, classification of the particle data regarding the domain is carried out at high speed.

Figure 6:
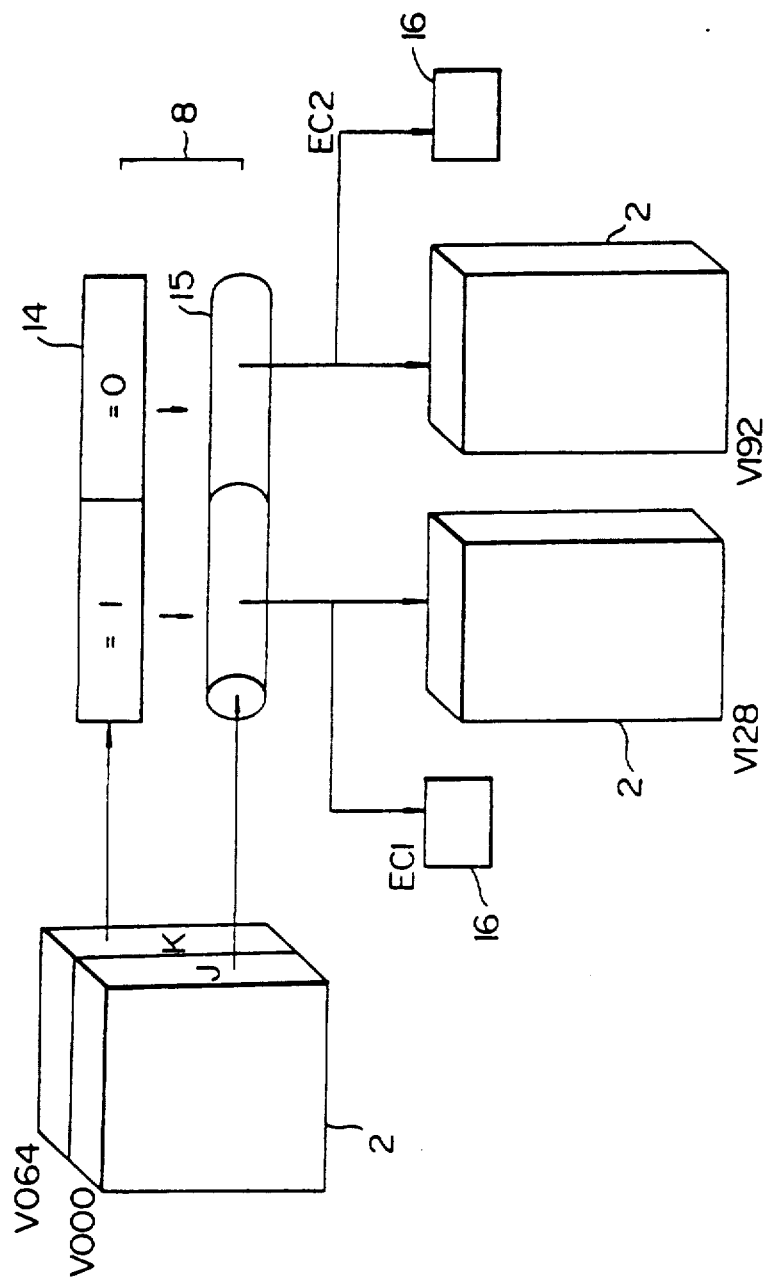
FIG. 6 is a block diagram of an event classification pipeline.

FIG. 6 is a block diagram of the event classification pipeline 8. The event classification pipeline 8 comprises a comparator 14 and a classification pipeline 15 which are coupled to the vector register 2 so that each of them receives data from the vector register 2. The event classification pipeline 8 has the same arrangement of the above-described geometric classification pipeline 7 except that the number of stages (the number of regions) is two. More specifically, the comparator 14 is comprised of comparator units arranged in a two-stage array so that data given to one end thereof is shifted toward the other end, and the classification pipeline 15 is comprised of gates similarly arranged in a two-stage array so that data given to one end thereof is shifted toward the other end. The comparator 14 and the classification pipeline 15 correspond to each other at each stage so that a trigger signal generated in accordance with the result of a comparison at each stage is given to the corresponding stage of the classification pipeline 15. The bank V000 of the vector register 2 is stored with data concerning each particle, while the bank V064 is stored with a true/false value representing the physical behavior of each particle, and data items that correspond to each other are synchronously supplied to the comparator 14 and the classification pipeline 15. The comparator 14 compares the true/false value of each particle supplied thereto with 1 and 0 and triggers the classification pipeline 15 according to the result of the comparison. In response to the trigger, the classification pipeline 15 stores the corresponding particle data into the corresponding region in the vector register 2 and, at the same time, increments the count of the corresponding counter 16 by one. More specifically, if the supplied particle domain number is equal to 1, the data concerning the particle is stored in the bank V128 of the vector register 2 and, at the same time, the counter EC1 is incremented by one, whereas, if the particle domain number is equal to 0, the particle data is stored in the bank V192 and, at the same time, the counter EC2 is incremented by one. In this way, classification of the particle data regarding behavior is carried out at high speed.

Figure 3:
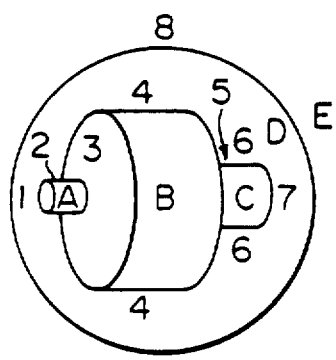
FIG. 3 shows one example of surface models, an expression of a domain in the case of the illustrated surface model, and a logical expression for discovering a lost particle.
Figures 4A, 4B, 4C:
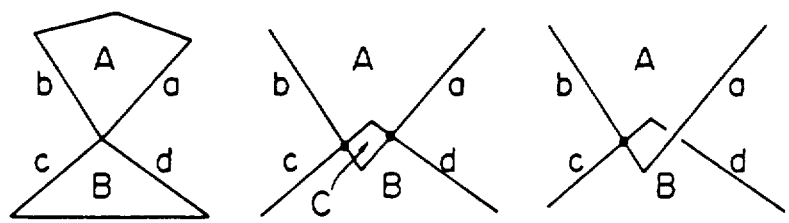
FIG. 4a, 4b, and 4c each exemplarily shows the occurrence of a contradictory domain.
Figures 7, 7A, 7B, 7C:
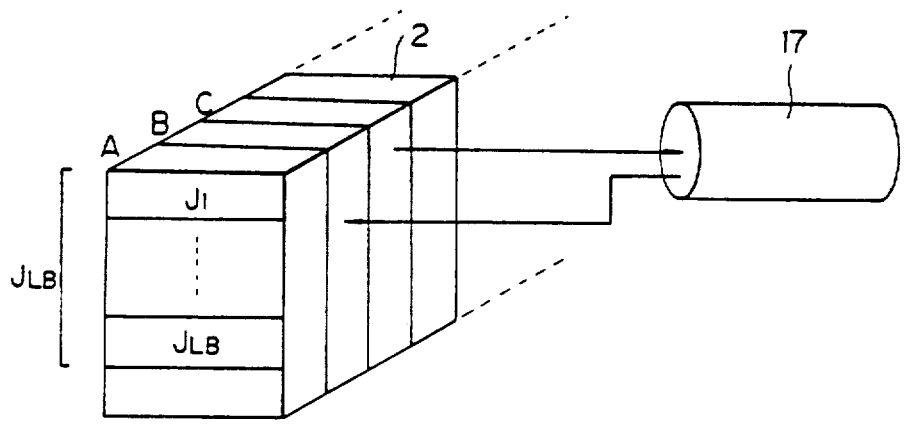
FIG. 7 is a block diagram of a domain decision pipeline.
FIG. 7a, 7b, and 7c shows the list, output, and operators respectively and FIGS. 8a and 8b together is a view employed to describe the operation of the domain decision pipeline.
Figures 8A, 8B:
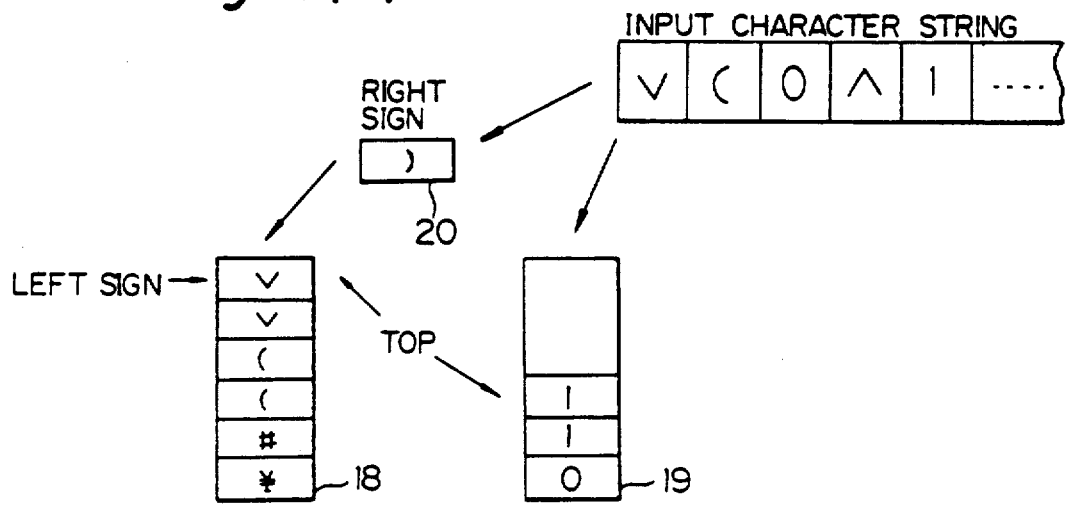

FIG. 7 is a block diagram of the domain decision pipeline, and FIG. 8 is a view employed to describe the operation of the domain decision pipeline. Referring to FIG. 7, the domain decision pipeline 17 is successively supplied with a list corresponding to the logical expression B described by use of FIG. 3 from the register element C of the vector register 2 and successively stores the values (0, 1) resulting from the processing of the list into the corresponding regions in the register element B. Specifically, the list that is supplied from the register element C is such as that shown in FIG. 7(a), and the output that is stored in the register element B is such as that shown in FIG. 7(b). FIG. 7(c) exemplarily shows operators in the list. Specifically, the domain decision pipeline 17 comprises two pushdown stacks 18 and 19 such as those shown in FIG. 8(a) whose maximum length corresponds to the number of vector elements of the vector register 2 which is divided into four parts, and a processing unit (not shown). The stack 18 stores therein the operators in the list successively supplied, while the stack 19 stores therein 0 and 1 which are operands in the list. The top sign in the stack 18 is called the "left sign", while an operator in the input character string which is temporarily placed in a character register 20 during processing is called the "right sign", and the stack 18 is pushed down or popped up in accordance with the combination of these signs. The table of FIG. 8(b) shows various combinations of the left and right signs and the corresponding operations. In the table, >means that the left sign is popped up with the right sign being left as it is; <means that the left sign is pushed down and the right sign is placed in the top of the stack 18 and, at the same time, the next operator in the input character string is placed as being a right sign; =means that the left sign is popped up and, at the same time, the right sign is replaced by the next input operator; and E means an erroneous combination. By processing data by use of a stack having such arrangement, it is possible to make a decision at high speed as to whether or not each of a large number of particles is present in a contradictory domain.

The address preset processing unit 10 according to the present invention comprises a relatively simple scalar processing unit which executes only processings required for address computation, such as instructions for loading, storing, multiplication, addition, subtraction, leftward/rightward shift, OR operation and AND operation of integers, and inherent general-purpose registers GOO to G15. The scalar processing unit is connected to the scalar register 3 of the vector computer independently of the conventional scalar processing unit 4 and is arranged to function on the basis of a proper combination of a directive in a source program and machine instructions generated in a compiler. Thus, a special scalar processing unit is provided independently of the conventional vector processing unit and scalar processing unit so that, while the conventional processing units are executing a DO loop, that is, a repetitive computation, the address of a variable which is to be used in the next DO loop is computed in the special scalar processing unit in parallel with the execution of the present DO loop, thereby enabling a reduction in the time required for the computation.

By adding the special pipelines described above to a conventional vector computer, it is possible to execute at high speed various kinds of classification processing which have heretofore diminished the processing speed because it is impossible to execute them by vector processing. Addition of the address preset processing unit enables the following parallel processing to be effected completely, that is, while the conventional vector processing unit and scalar processing unit are executing DO loop, the address of a variable which is to be used in the next DO loop is computed in parallel. Thus, it is possible to solve most of the problems inherent in conventional vector computer systems and to improve performance by five to ten times per vector processor.

Although the vector computer system according to the present invention has been described by way of an example in which the present invention is applied to the simulation of the behavior of particles such as neutrons and photons in nuclear power technology by use of a particle model and a surface model, it should be noted that the application of the pipelines and address preset processing unit according to the present invention is not necessarily limited to the foregoing and that it is, as a matter of course, possible to apply them to other models, for example, a continuum model and a solid model, and also to the classification of data used in computation in other fields.

Although the foregoing pipelines and address preset processing unit according to the present invention exhibit markedly advantageous effects when they are combined together, it is a matter of course that advantageous effects are also obtained by individually adding them to a vector computer.

What is claimed is:

1. A classification processing unit for use with a computer having a first storage bank for storing data items, a second storage bank for storing classification data respectively associated with said data items, and result storage banks for storing classified data items, said classification processing unit comprising:
    a classification pipeline coupled to said first storage bank for receiving said data items, said classification pipeline comprising a series of classification units;
    a comparator coupled to said second storage bank for receiving said classification data, said comparator comprising a series of comparator units, each comparator unit associated with respective said classification units, each comparator unit having a reference value for comparing with said classification data, wherein said data items and said classification data are respectively shifted along said classification units and said comparator units in synchronization and wherein said comparator units trigger the respectively associated classification units to supply data items to one of said result storage banks as classified data items when the classification data received by said one of said comparator units and the reference value associated with said one of said comparator units have a predetermined relationship.

2. A classification processing unit according to claim 1, wherein said computer is a graphics processing system for representing particles in a space and wherein each data item represents an attribute of a particle in said space, each classification data respectively associated with each of said data items represents a specific domain in said space where a particle to be represented by said graphics processing system is present, and said reference values associated with said comparator units represent domains for each geometric configuration of said space.

3. A classification processing unit according to claim 1, wherein said computer is a graphics processing system for representing particles in a space and wherein each data item represents an attribute of a particle in said space, each of said classification data respectively associated with each of said data items is a logical value representing the behavior or state of a particle to be represented in said graphics processing system, and said reference values associated with said comparator units are logical values representing the behavior or state of a particle in said space.

4. A classification processing unit according to claim 1, further comprising a counter provided for each of said classification units to count the number of data items that are stored by each classification unit into an associated result storage bank.

5. A classification processing unit, usable in a vector computer, for processing data items that are respectively classifiable in one of a plurality of classifications, said classification processing unit comprising:
    a vector register having a first storage bank for storing the data items, a second storage bank for storing classification data respectively classifying the data items into one of said classifications, and result storage banks respectively corresponding to each of said classifications;
    means for synchronously reading data items and corresponding classification data from said first and second storage banks;
    a comparator including comparator units respectively corresponding to said classifications and including means for shifting classification data through said comparator units, each said comparator unit comparing classification data read from said second storage bank with a reference value corresponding to one of said classifications and generating a trigger signal when the classification data and the reference value have a predetermined relationship; and
    a classification pipeline including classification units respectively associated with said comparator units and including means for shifting data items through said classification units in synchronization with associated classification data shifting through said comparator units, each said classification unit responsive to trigger signals from the associated comparator unit for supplying data items, which are read from the first storage bank and which correspond to the classification data that generates the trigger signal, to a result storage bank of said vector register.

6. The classification processing unit according to claim 5, further comprising:
    a counter provided for each of said classification units to count the number of data items that are stored by each classification unit into an associated result storage bank.

7. The classification processing unit according to claim 5, wherein said classification units are logic gates.

8. The classification processing unit according to claim 5, wherein said comparator units generate trigger signals when the classification data is equal to the reference value.

9. A classification processing unit according to claim 5, wherein said computer is a graphics processing system for representing particles in a space and wherein each data item represents an attribute of a particle in said space, each classification data respectively associated with each of said data items represents a specific domain in said space where a particle to be represented by said graphics processing system is present, and said reference values associated with said comparator units represent domains for each geometric configuration of said space.

10. A classification processing unit according to claim 5, wherein said computer is a graphics processing system for representing particles in a space and wherein each data item represents an attribute of a particle in said space, each of said classification data respectively associated with each of said data items is a logical value representing the behavior or state of a particle to be represented in said graphics processing system, and said reference values associated with said comparator units are logical values representing the behavior or state of a particle in said space.

* * * * *